United States Patent
Qin et al.

(10) Patent No.: US 9,316,716 B2
(45) Date of Patent: Apr. 19, 2016

(54) DYNAMIC ATTITUDE MEASUREMENT METHOD OF STAR SENSOR BASED ON GYRO'S PRECISE ANGULAR CORRELATION

(71) Applicant: NATIONAL UNIVERSITY OF DEFENSE TECHNOLOGY, Hunan (CN)

(72) Inventors: Shiqiao Qin, Hunan (CN); Dejun Zhan, Hunan (CN); Jiaxing Zheng, Hunan (CN); Wei Wu, Hunan (CN); Hui Jia, Hunan (CN); Sihua Fu, Hunan (CN); Liheng Ma, Hunan (CN)

(73) Assignee: National University of Defense Technology, Hunan (CN)

( * ) Notice: Subject to any disclaimer, the term of this patent is extended or adjusted under 35 U.S.C. 154(b) by 0 days.

(21) Appl. No.: 14/569,209

(22) Filed: Dec. 12, 2014

(65) Prior Publication Data

US 2015/0185009 A1   Jul. 2, 2015

(30) Foreign Application Priority Data

Dec. 26, 2013   (CN) .......................... 2013 1 0730542

(51) Int. Cl.
| | | |
|---|---|---|
| *G01C 9/00* | (2006.01) | |
| *G01S 3/786* | (2006.01) | |
| *G01C 21/02* | (2006.01) | |
| *G01S 5/16* | (2006.01) | |

(52) U.S. Cl.
CPC ............. *G01S 3/7867* (2013.01); *G01C 21/025* (2013.01); *G01S 5/163* (2013.01)

(58) Field of Classification Search
None
See application file for complete search history.

(56) References Cited

U.S. PATENT DOCUMENTS 6,236,939 B1 * 5/2001 Wu et al. .......................... 701/13
2013/0103343 A1   4/2013 Liu

FOREIGN PATENT DOCUMENTS

| CN | 101696884 A | 4/2010 |
|---|---|---|
| CN | 200810209622.X | 6/2010 |
| CN | 101846510 A | 9/2010 |

(Continued)

OTHER PUBLICATIONS

X.Fei et al.; "A Novel Approach Based on MEMS-Gyro's Data Deep Coupling for Determining the Centroid of Star Point" published in Mathematical Problems in Engineering in Aug. 2012; Article ID403584; pp. 1-20.

(Continued)

*Primary Examiner* — Aditya Bhat
(74) *Attorney, Agent, or Firm* — Studebaker & Brackett PC (57) ABSTRACT

The disclosure discloses a dynamic attitude measurement method of a star sensor based on gyro's precise angular correlation. On the basis that a dynamic compensation is performed on each of the measurement exposure frames of the star sensor and a fixed star matching vector matrix having dynamic error and noise influence is obtained in a prior art, a transform matrix between every two adjacent measurement frames of the star sensor is precisely measured by a unit including three gyros fixedly coupled with the star sensor. The transform matrix correlates the matched vector matrixes of the adjacent measurement frames of the star sensor. Finally, a correlated measurement equation is established with a series of correlated measurement frames, which is corresponding to processing a series of measurement frames as a single measurement frame.

5 Claims, 5 Drawing Sheets

(56) References Cited

FOREIGN PATENT DOCUMENTS

| CN | 2010010194288.2 | 3/2013 |
|---|---|---|
| CN | 201310053071.3 | 6/2013 |

OTHER PUBLICATIONS

A. Pasetti et al.; "Dynamical Binning for High Angular Rate Star Tracking" published in Proceedings of the Fourth ESA International Conference on Spacecraft Guidance, Navigation and Control Systems, Netherlands, 1999; pp. 1-12.

W. Zhang et al.; "Blurred Star Image Processing for Star Sensors under Dynamic Conditions" published in Sensors (Issue 12, 2012); ISSN 1424-8220; www.mdpi.com/journal/sensors; pp. 6712-6726.

W. Tingyuan et al.; "Satellite Attitude Determination Based on Redundant Gyro System and Star Sensor"; Computer Management and Control; pp. 634-636; NUAA, Nanjing 210016, China.

Y. Zhang et al.; "FOG/Star-sensor Combination Technology for Satellite Three-axis Attitude Determination"; pp. 1-4.

Chinese Office Action with Search Report; 201310730542.X; Aug. 20, 2014.

* cited by examiner

DYNAMIC ATTITUDE MEASUREMENT METHOD OF STAR SENSOR BASED ON GYRO'S PRECISE ANGULAR CORRELATION

This application claims priority to Chinese Patent Application No. 201310730542.X, filed on Dec. 26, 2013, which is hereby incorporated by reference in its entirety.

TECHNICAL FIELD

The disclosure relates to the field of navigation positioning, particularly the field of high-precision composition navigation positioning by an inertial measurement and a star sensor, and specifically to a dynamic attitude measurement method of a star sensor based on gyro's precise angular correlation.

BACKGROUND

A gyro is an inertial measurement device capable of measuring a rotation angular velocity of a motion carrier relative to an inertial space, and measurement precision of the angular velocity is a key parameter representing performance level of the gyro. An angle is an integration of angular velocity, and an error of the angle measurement increases with the increase of integration time, which is a common problem of all inertial measurement devices including gyros. A star sensor (hereinafter referred to as: SS) is a device for the navigation-positioning of a motion carrier through fixed stars, and it is particularly adaptive to the attitude measurement of the motion carrier. The main characteristic of the star sensor is that the measurement precision does not vary with time. However, there is a large dynamic influence from the motion carrier, particularly the rotation motion of the motion carrier. The higher the rotation angular velocity of the motion carrier is, the severer blurring the image of measured fixed star on the star sensor has, and in turn the measurement precision becomes poorer and is far deteriorated from that when the star sensor is stationary. Therefore, how to maintain high-precision attitude measurement of the star sensor under highly dynamic environment is a difficulty urgently to be solved in the navigation positioning.

A paper "A Novel Approach Based on MEMS-Gyro's Data Deep Coupling for Determining the Centroid of Star point" published in *Mathematical Problems in Engineering* in August 2012 introduces a method of real-timely measuring an angular velocity in the exposure time of a star sensor with three MEMS gyros, calculating lengths and directions of star points in an image plane of the star sensor according to the angular velocity, determining a window size of a centroid extraction algorithm of the star points, and extracting centric coordinates of the star points with the centroid extraction algorithm. The method establishes, based on Extended Kalman Filter (EKF) algorithm, an EKF equation that merges the real-timely measured angular velocities of the gyros and the centroid extraction algorithm of the star points, and obtains optimal estimations of the coordinates of the star points in a single measurement given by the star sensor under dynamic conditions. As for the dynamic condition of 8°/s of the five-magnitude star, the extraction precision is below one pixel.

In order to resolve nonlinear problem of state equation in a satellite attitude determination system, a Chinese patent publication, titled "high-precision satellite attitude determination method based on star sensor and gyro" (publication number: CN201010194288.2) proposes a filtering method based on non-linear prediction to estimate a model error, which performs an optimal state estimation using an interpolation filtering after compensating for the state equation, so as to obtain the satellite attitude. The patent document does not relate to the processing of dynamic images of the star sensor.

A paper "Dynamical Binning for High Angular Rate Star Tracking" published in *Proceedings of the Fourth ESA International Conference on Spacecraft Guidance, Navigation and Control Systems, Netherlands*, 1999 introduces a dynamic binning method combined with Active Pixel Sensor (APS) technique, in which the angular velocity of a star sensor is measured in real time through a gyro, and movement of pixels in the APS-CCD is synchronously controlled to eliminate dynamic influence. Although the method may achieve higher precision under higher dynamic conditions when it is used in a satellite, the influence from the rotation angular velocity around the optical axis of the star sensor cannot be eliminated.

A paper "Blurred Star Image Processing for Star Sensors under Dynamic Conditions" published in *Sensors* (Issue 12, 2012) introduces a method of restoring the motion-blurred image according to an angular velocity obtained from adjacent frames. In the method, firstly a Fourier transform is applied to a star image frame of the star sensor so as to convert to the frequency domain. Then deconvolution is made in the frequency domain by using Wiener filtering according to the angular velocity. Finally, an inverse Fourier transform is implemented so as to convert to a spatial domain. Therefore, the influences from the dynamic trailing and the dynamic blurring of the star image may be better solved, and the recovered star points may reach sub-pixel precision. However, the method predicts motion parameters using information of adjacent frames, and the error is large under high dynamic conditions, which leads to great difference between the original star image obtained from the deconvolution and the static star image. In addition, only a single-frame star image is processed in the attitude determination and the number of effective fixed stars is limited in the field of view of the single-frame star image, which statistically restricted its precision improvement.

The Chinese patent application, titled "star tracking method of star sensor under high dynamic state" (application number: CN200810209622.X) proposes to extract corresponding star image coordinates from a star image of the current frame according to ideal star image coordinate information predicted from a previous frame of the star sensor, and calculates attitude information of the current frame of the star sensor by using the star image coordinates extracted from the current frame and celestial coordinates corresponding to the star images. Thus it provides a tracking algorithm for extracting actual star image positions with reference to an ideal star image center predicted from the previous frame. The Chinese patent application, titled "method for restoring fixed star image under high dynamic" (Application Number: CN201310053071.3) proposes to predict the attitude of the current frame according to attitude information of the previous two frames, on the basis of the mobile quaternion information of the attitudes of star images for the previous two frames. The mobile quaternion is used to recover the fixed star image of the current frame, thereby extracting the star image coordinates for an attitude calculation. The essence of both is to predict and process the current image frame according to the angular velocity obtained from the attitudes of the previous two frames measured by the star sensor when there is no gyro, and the difference only lies in the specific methods. Since the dynamic conditions have a significant influence on the attitude measurement precision of the star sensor, the errors of the angular velocities obtained by the two methods are very large, and the effect of the dynamic compensation based on such angular velocities is poor. Meanwhile, both methods use the star image information of a single-frame star image in the attitude calculation, without extending the field of view or increasing the number of effective star points in the view filed, thus the attitude precision is restricted by the limited number of fixed stars in the single-frame star image.

By compensating for the dynamic image frame of the star sensor based on the angular velocity measured by the gyro, the influence of the angular motion on the extraction of the star point coordinates may be effectively reduced. Thus, the measurement precision of the star sensor under dynamic conditions is improved. However, due to the joint influences from the noise, exposure time of the star sensor and deconvolution, etc., the extraction precision of the star sensor coordinates is poorer than that of static conditions, and may not meet the requirement of high-precision measurement under dynamic conditions.

DETAILED DESCRIPTION OF THE EMBODIMENT

With respect to the deficiency of the prior art, the inventors propose a dynamic attitude measurement method of a star sensor based on gyro's precise angular correlation, which meet the requirement of high-precision measurement under dynamic conditions.

The principle of the invention is that each of the measurement exposure frames of the star sensor is processed with the prior art to obtain the star point coordinates of each measurement frame after the angular velocity compensation. Then, the matched vector pairs of each star point coordinate are obtained by searching the standard star image and making matches. On this basis, the angular relation between adjacent measurement frames of the star sensor is precisely measured with the gyro, and the matched vector pairs of the adjacent two measurement frames of the star sensor are correlated with each other through the precise angular relation. Finally, an correlated measurement equation is established using a series of correlated measurement frames, which is corresponding to processing a series of measurement frames as a single measurement frame, and an attitude matrix is solved by using the least square method to obtain high-precision attitudes of the motion carrier and its change information.

Figure 1:
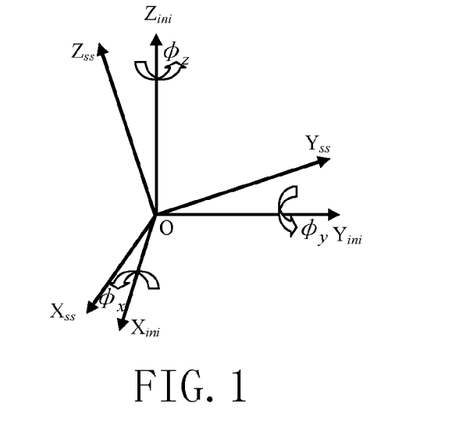
FIG. 1 is a view of a transform between a star sensor coordinate and an inertial coordinate system.
Figure 2:
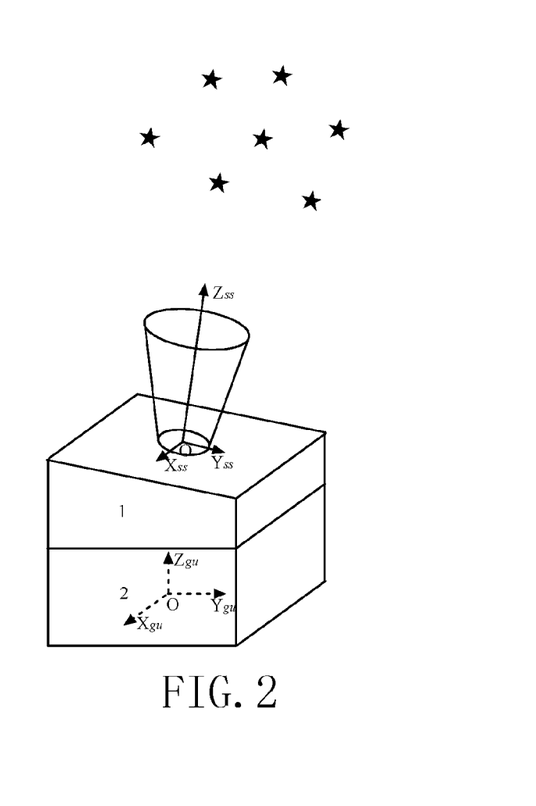
FIG. 2 is a schematic diagram of a rigid fixed coupling between a star sensor and a gyro unit.

Three coordinate systems are defined, inertial coordinate system $O\text{-}X_{ini}Y_{ini}Z_{ini}$, star sensor coordinate system $O\text{-}X_{ss}Y_{ss}Z_{ss}$, and gyro unit (hereinafter referred to as GU) coordinate system $O\text{-}X_{gu}A_{gu}Z_{gu}$, as shown in FIGS. 1 and 2. In this disclosure, the superscripts and/or subscripts "gu", "ss" and "ini" are used in related physical variables to indicate the variables in the gyro unit coordinate system, the star sensor coordinate system and the inertial coordinate system, respectively, and/or transformed from one coordinate system to another, and the same below.

An attitude matrix from the star sensor coordinate system to the inertial coordinate system is denoted by $C_{ss}^{ini}$ and a unit vector of an optical axis of the star sensor is denoted by I, a direction vector L in the inertial coordinate system corresponding to the vector I may be written as:

$$L = C_{ss}^{ini} I \qquad (1)$$

Due to the influence of dynamic conditions, position extraction of star points in a single frame has a large measurement error, which may be described by a variance $\sigma_\epsilon$. Without loss of generality, a pixel is used as the unit of the variance $\sigma_\epsilon$, and an angular measurement error $E_{single}$ of single star point may be expressed as:

$$E_{single} = \frac{A_{FOV}}{N_P} \sigma_\epsilon \qquad (2)$$

wherein $N_P$ is the number of 1-D pixels of an image detector in the star sensor, and $A_{FOV}$ is a 1-D field of view of the star sensor.

The direction vector of the extracted star points in the star sensor coordinate system is denoted by s, an error vector of the extracted star points is denoted by e, and the direction vector of the fixed star corresponding to the star points in the inertial coordinate system is denoted by p, then:

$$p = C_{ss}^{ini}(s+e) \qquad (3)$$

There are numbers of stars available for matching in each frame of star image of the SS. The number of stars available is denoted by n, the direction vectors of the n stars in the SS coordinate system are denoted by $s_1, s_2, \ldots,$ and $s_n$, respectively, and the error vectors are $e_1, e_2, \ldots,$ and $e_n$, respectively, then, an average value $\bar{n}$ of n may be expressed by an equation below:

$$\bar{n} = 6.57 e^{1.05 M_{ss}} \frac{1 - \cos(A_{FOV}/2)}{2} \qquad (4)$$

wherein $M_{ss}$ is detection sensitivity of star magnitude of SS.

The direction vectors of n stars in the SS coordinate system are denoted by matrix S and corresponding error vectors are denoted by matrix E, then the matrixes S and E may be expressed as:

$$S = [s_1, s_2, \ldots, s_n]$$

$$E = [e_1, e_2, \ldots, e_n] \qquad (5)$$

After searching and matching the standard star image, the direction vector s of each star in the SS coordinate system is related to a unique direction vector p in the inertial coordinate system. The direction vectors of n fixed stars in the inertial coordinate system are denoted by $p_1, p_2, \ldots,$ and $p_n$, respectively, then a direction vector matrix P of these n fixed stars in the inertial coordinate system may be expressed as:

$$P = [p_1, p_2, \ldots, p_n] \qquad (6)$$

According to the equation (3), matrixes P and S satisfy:

$$P = C_{ss}^{ini}(S+E) \tag{7}$$

Based on the direction vectors S of n fixed stars in the SS coordinate system and the direction vectors P of n fixed stars in the inertial coordinate system, the attitude matrix $C_{ss}^{ini}$ of a single frame may be obtained using the least square method, according to the equation (7), and an optimal solution $\tilde{C}_{ss}^{ini}$ is called optimal attitude matrix of the single frame. This is a process of attitude determination, which determines the transform relationship from the SS coordinate system to the inertial coordinate system. The matrix $C_{ss}^{ini}$ may be expressed by three Euler angles, $\phi_x$, $\phi_y$ and $\phi_z$. It means that the SS coordinate system may be obtained by rotating the inertial coordinate system around the axis Z, axis X and axis Y successively by angles $\phi_z$, $\phi_x$ and $\phi_y$, as illustrated in FIG. 1. In this case, a specific form of the matrix $C_{ss}^{ini}$ is expressed in terms of equation (8):

$$C_{ss}^{ini} = \begin{bmatrix} \cos\phi_y\cos\phi_z - \sin\phi_y\sin\phi_x\sin\theta_z & -\cos\phi_x\sin\phi_z & \sin\phi_y\cos\phi_z + \cos\phi_y\sin\phi_x\sin\phi_z \\ \cos\phi_y\sin\phi_z + \sin\phi_y\sin\phi_x\cos\theta_z & \cos\phi_x\sin\phi_z & \sin\phi_y\sin\theta_z - \cos\phi_y\sin\phi_x\cos\phi_z \\ -\sin\phi_y\cos\phi_x & \sin\phi_x & \cos\phi_y\cos\phi_x \end{bmatrix} \tag{8}$$

Because of the presence of error matrix E, there is an error between the optimal attitude matrixes $\tilde{C}_{ss}^{ini}$ of a single frame and $C_{ss}^{ini}$, and its value may be expressed by an optical axis pointing error of the SS. Assuming that errors of different star points in one frame of star image are independent on each other, according to equation (2), the optical axis pointing error E of the SS after the attitude determination with n stars is obtained:

$$E = \frac{A_{FOV}}{N_P} \frac{\sigma_\varepsilon}{\sqrt{n}} \tag{9}$$

It is obvious that in the single frame measurement, the optical axis pointing error E will increase as the extraction error $\sigma_\varepsilon$ of star point positions increases, which is a common problem of the existing star sensor measurement techniques.

On the basis of single frame measurement, the present disclosure widens the vision to the correlations between different frames. The present disclosure proposes a strapped-down rigid coupling of a gyro unit 1 with three single-axis gyros orthogonally mounted and a star sensor 2, as illustrated in FIG. 2.

Three Euler angles between the SS coordinate system O-$X_{ss}Y_{ss}Z_{ss}$ and the GU coordinate system O-$X_{gu}Y_{gu}Z_{gu}$ are denoted by $\psi_x$, $\psi_y$ and $\psi_z$, and the transform matrix from the GU coordinate system to the SS coordinate system is $C_{gu}^{ss}$, then the expression of the matrix $C_{gu}^{ss}$ is similar to equation (8). $C_{gu}^{ss}$ and the three Euler angles $\psi_x$, $\psi_y$ and $\psi_z$ may be accurately measured and calibrated using prior techniques (see the paper for details "high accuracy calibration method of the installation error between SINS and star sensor" published by WANG Yan in *Control Technology of Tactical Missile*, Volume 26, Issue 3, 2009).

Due to the rigid coupling of GU and SS, the rotation angle of the SS in the inertial space may be measured by the GU simultaneously. Under dynamic conditions, the angular velocity vector of the SS relative to the inertial space is denoted by $\Omega^{ss}$, and three angular velocity components measured by the GU are $\Omega_x$, $\Omega_y$, and $\Omega_z$, $\Omega^{gu}=[\Omega_x, \Omega_y, \Omega_z]^T$. The projection $\Omega^{ss}$ of the vector $\Omega^{gu}$ in the star sensor coordinate system is given by:

$$\Omega^{ss} = C_{gu}^{ss}\Omega^{gu} \tag{10}$$

Figure 4A:
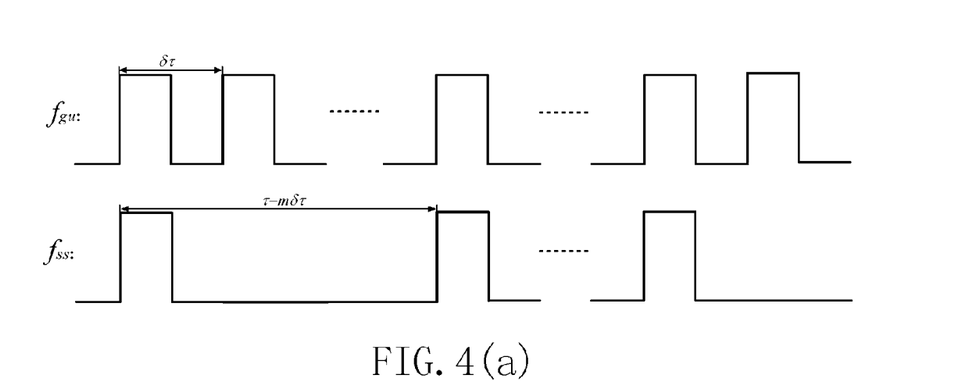
FIG. 4(a) is a synchronous time sequence chart of synchronous sampling time sequences of the gyro unit and the star sensor.

The exposure time interval between adjacent frames of the SS is denoted by $\tau$, then the exposure frequency is $f_{ss}=1/\tau$, and a sampling period of the angular velocity measurement by the GU is $\delta\tau$. In order to ensure real-time performance of the angular velocity measurement by the GU, the sampling period $\delta\tau$ should be much smaller than $\tau$ and also synchronized with the exposure time interval $\tau$, that is, $\tau=m\delta\tau$ (m is an integer far bigger than 1), as illustrated in FIG. 4. The rotation angle of the SS in the time $\tau$ may be calculated with the projection $\Omega^{ss}$ through a quaternion motion equation. The motion equation of an attitude quaternion q may be expressed as:

$$\dot{q} = \frac{1}{2} q \otimes [0, \Omega^{ss}]^T \tag{11}$$

wherein, $\dot{q}$ is a differentiation of the attitude quaternion q, and a symbol $\otimes$ represents a multiplication of the quaternion.

Integration and discretization are applied to equation (11). The attitude quaternions before and after the $\lambda^{th}$ sampling by the GU with an interval $\delta\tau$ are denoted by $q(\lambda-1)$ and $q(\lambda)$, respectively, their relationship may be given by:

$$q(\lambda) = q(\lambda-1) \otimes \delta q \tag{12}$$

$$= \begin{bmatrix} q_0(\lambda-1), -q_1(\lambda-1), -q_2(\lambda-1), -q_3(\lambda-1) \\ q_1(\lambda-1), q_0(\lambda-1), -q_3(\lambda-1), q_2(\lambda-1) \\ q_2(\lambda-1), q_3(\lambda-1), q_0(\lambda-1), -q_1(\lambda-1) \\ q_3(\lambda-1), -q_2(\lambda-1), q_1(\lambda-1), q_0(\lambda-1) \end{bmatrix}$$

$$\begin{bmatrix} \cos(|\delta\Phi|/2) \\ (\delta\Phi_x/|\delta\Phi|)\sin(|\delta\Phi|/2) \\ (\delta\Phi_y/|\delta\Phi|)\sin(|\delta\Phi|/2) \\ (\delta\Phi_z/|\delta\Phi|)\sin(|\delta\Phi|/2) \end{bmatrix}$$

wherein, $\delta\Phi$ is an angular increment in the time $\iota\tau$, $\delta\Phi = [\delta\Phi_x, \delta\Phi_y, \delta\Phi_z]^T = \Omega^{ss}(\lambda)\delta\tau$ ($\delta\Phi_x$, $\delta\Phi_y$, $\delta\Phi_z$ are components of $\delta\Phi$ along axes X, Y, Z), $\Omega^{ss}(\lambda)$ is a projection value of the $\lambda^{th}$ sampling by the GU in the SS coordinate system, which may be calculated through the equation (10), and $\delta q$ is the attitude quaternion updated accumulatively in the time $\delta\tau$.

There are m samplings in a period of $\delta\tau$ in an exposure time from the $(k-1)^{th}$ frame to the $k^{th}$ frame of the SS. The initial condition of quaternion q is $q(0)=[1,0,0,0]^T$. The attitude quaternion $q(\tau)$ at the time $\tau$ may be obtained through m times of attitude updates using $\Omega^{ss}$ according to the equation (12). The angular correlation matrix $C_k^{k-1}$ from the $(k-1)^{th}$ frame to the $k^{th}$ frame is obtained from $q(\tau)=q_0,q_1,q_2,q_3]^T$, wherein:

$$C_k^{k-1} = \begin{pmatrix} q_0^2+q_1^2-q_2^2-q_3^2 & 2(q_1q_2-q_0q_3) & 2(q_1q_3+q_0q_2) \\ 2(q_1q_2+q_0q_3) & q_0^2-q_1^2+q_2^2-q_3^2 & 2(q_2q_3-q_0q_1) \\ 2(q_1q_3-q_0q_2) & 2(q_2q_3+q_0q_1) & q_0^2-q_1^2-q_2^2+q_3^2 \end{pmatrix} \tag{13}$$

Figure 3:
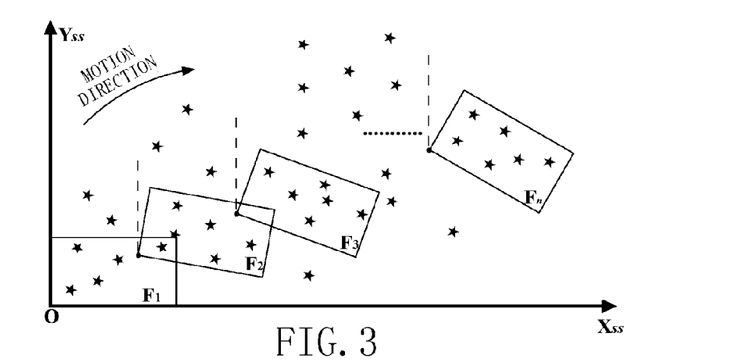
FIG. 3 is a schematic diagram of a correlated frame sequence of the star sensor.

The SS acquires one frame of star image at every time interval of $\tau$. Due to the carrier motion, a series of star image frames $F_1, F_2, \ldots, F_n$ measured by the SS will result in attitude change, relative to the standard star image (taking the first frame $F_1$ as the origin), as illustrated in FIG. 3.

Under dynamic conditions, the coordinate system of the $k^{th}$ frame may be obtained by successively rotating the coordinate system of the $(k-1)^{th}$ frame by Euler angles $\theta_z$, $\theta_x$ and $\theta_y$:

$$\begin{cases} \theta_x = \arcsin(2q_2q_3 + 2q_0q_1) \\ \theta_y = -\arctan\dfrac{2(q_1q_3 - q_0q_2)}{q_0^2 - q_1^2 - q_2^2 + q_3^2} \\ \theta_z = -\arctan\dfrac{2(q_1q_2 - q_0q_3)}{q_0^2 - q_1^2 + q_2^2 - q_3^2} \end{cases} \quad (14)$$

Therefore, the precise angular relationship $\theta_x$, $\theta_y$, $\theta_z$ between adjacent frames may be measured by the gyro unit.

The transform matrix from the coordinate system of the $(k-1)^{th}$ frame of the SS to the inertial coordinate system is $C_{ss}^{ini}(k-1)$, the transform matrix from the coordinate system of the $k^{th}$ frame of the SS to the inertial coordinate system is $C_{ss}^{ini}(k) = C_{ss}^{ini}(k-1)C_k^{k-1}$. The direction vector matrixes $P_{k-1}$, $P_k$ and $S_{k-1}$, $S_k$ of star images of the $(k-1)^{th}$ frame and the $k^{th}$ frame after search-matching meet the following equation:

$$\begin{cases} P_{k-1} = C_{ss}^{ini}(k-1)(S_{k-1} + E_{k-1}) \\ P_k = C_{ss}^{ini}(k)(S_k + E_k) \\ \quad = C_{ss}^{ini}(k-1)C_k^{k-1}(S_k + E_k) \\ \quad = C_{ss}^{ini}(k-1)(C_k^{k-1}S_k + C_k^{k-1}E_k) \\ \quad = C_{ss}^{ini}(k-1)(S_k^{k-1} + E_k^{k-1}) \end{cases} \quad (15)$$

As can be seen from the equation (15), two adjacent frames share the same attitude transform matrix $C_{ss}^{ini}(k-1)$, and the two frames may be merged into one frame for processing:

$$[P_{k-1}, P_k] = C_{ss}^{ini}(k-1)[(S_{k-1}+E_{k-1}), (S_k^{k-1}+E_k^{k-1})] \quad (16)$$

This star image frame is called Angle Correlated Frame (ACF). Compared to the equation of a single frame, the number of fixed star vectors in the equation of the merged frame is doubled. Thus, the error is reduced by $\sqrt{2}$ times when the attitude matrix $C_{ss}^{ini}(k-1)$ is solved using the least square method, which corresponds to that two frames of star image are changed into one frame of big star image through ACF for processing.

Similarly, according to ACF, a star image frame sequence 1, 2, . . . , k measured by the SS may be correlated to the $1^{st}$ frame:

$$\begin{cases} [P_1, P_2, \ldots, P_k] = C_{ss}^{ini}(1)[(S_1 + E_1), (S_2^1 + E_2^1), \ldots, (S_k^1 + E_k^1)] \\ S_{l_o}^1 = \left(\prod_{t=2}^{r=l_o} C_r^{r-1}\right) S_{l_o} = C_{l_o}^1 S_{l_o} \\ E_{l_o}^1 = \left(\prod_{t=2}^{r=l_o} C_r^{r-1}\right) E_{l_o} = C_{l_o}^1 E_{l_o}, \, l_o \in [2, k] \end{cases} \quad (17)$$

wherein, $(P_1, S_1), \ldots, (P_k, S_k)$ are direction vector matrixes of star points in the star image frames obtained by search-matching from the $1^{st}$ frame, . . . , the $k^{th}$ frame of the star images measured by the SS, in the inertial coordinate system and the SS coordinate system, respectively, $E_1, \ldots, E_k$ are error vector matrixes of star points in each of the $1^{st}$ frame, . . . , the $k^{th}$ frame of the star images measured by the star sensor, $C_{ss}^{ini}(1)$ is a transform matrix from the coordinate system of the $1^{st}$ frame of the star sensor to the inertial coordinate system, $C_r^{r-1}$ is an angular correlation matrix from the $r^{th}$ frame of the star sensor to the $(r-1)^{th}$ frame measured by the gyro unit, $C_{l_o}^1$ is an angular correlation matrix measured by the gyro unit that directly correlates the $l_o^{th}$ frame of the star sensor to the $1^{st}$ frame of the star sensor, the error of the least square solution of $C_{ss}^{ini}(1)$ is reduced by $\sqrt{k}$ times due to the correlation of k frames of star images. Once the frame number k is large enough, the suppression effect of dynamic error is very obvious, which makes the measurement precision of star sensor under dynamic conditions reach the same level as under static conditions.

However, the angular measurement error of the gyro increases with the accumulation of time. Thus, the corresponding error of the angular transform matrix $C_k^1$ that directly transforms from the $k^{th}$ frame of the star sensor to the $1^{st}$ frame of the star sensor increases as well. When the error of $C_k^1$ increases to be close to that of the attitude matrix obtained through the single frame processing, it will not make sense to further increase the frame number k. Thus, the frame number k has an appropriate maximum value $K_{max}$ (the maximum value of the correlated frame number in the frame sequence), based on the expected measurement precision value $E_{exp}$ of the star sensor. The appropriate maximum value $K_{max}$ is related to the measurement precision $\omega$ of the gyro, the exposure frequency $f_{ss}$ of the star sensor, and the expected measurement precision value $E_{exp}$ of the star sensor.

The longest correlation time of the frame sequence of the star sensor is:

$$T_{max} = \frac{E_{exp}}{\omega} \quad (18)$$

The maximum number of correlated frames of the star sensor, i.e., the maximum value of the frame number k is:

$$K_{max} = f_{ss} T_{max} = \frac{f_{ss} E_{exp}}{\omega} \quad (19)$$

As can be seen from the equation (19), the higher the expected measurement precision $E_{exp}$ of the star sensor is, the lower the exposure frequency $f_{ss}$ of the star sensor is, and worse the precision $\omega$ of the gyro is, the smaller the $K_{max}$ is. Contrarily, the $K_{max}$ is larger.

Some typical values of $K_{max}$ are listed in Table 1.

TABLE 1

The number of maximum correlated frames

| Gyro precision $\omega$ (°/hr) | Exposure frequency $f_{ss}$ | Expected precision (arc-second) | Correlation time (second) | $K_{max}$ | $\sqrt{K_{max}}$ |
|---|---|---|---|---|---|
| 0.001 | 10 | 1 | 1000 | 10000 | 100 |
| 0.01 | 10 | 1 | 100 | 1000 | 31 |
| 0.1 | 10 | 1 | 10 | 100 | 10 |
| 0.001 | 50 | 1 | 1000 | 50000 | 223 |
| 0.01 | 50 | 1 | 100 | 5000 | 70 |
| 0.1 | 50 | 1 | 10 | 500 | 22 |
| 0.001 | 10 | 3 | 3000 | 30000 | 173 |
| 0.01 | 10 | 3 | 300 | 3000 | 54 |
| 0.1 | 10 | 3 | 30 | 300 | 17 |

According to equations (9) and (19), the optical axis pointing error of the star sensor based on the correlated frame sequence of the ACF technology is given by:

$$E_{ss} = \frac{A_{FOV}}{N_P} \frac{\sigma_\varepsilon}{\sqrt{nK_{max}}} \qquad (20)$$

As can be seen from Table 1, on the basis of the dynamic processing of the single measurement frame, in order to make the star sensor reach equivalent precision to that in static conditions, selecting a gyro with the precision of 0.01°/hr is necessary and appropriate. There are numbers of gyros available with such precision, such as middle-precision laser gyro, high-precision fiber gyro and high-precision flexible gyro, etc. In addition, the exposure frequency of the star sensor is usually below 10 Hz. Under dynamic conditions, the increase of the exposure frequency not only reduces the dynamic influence of the single frame, but also enhances the noise suppression ability by increasing the number of the correlated frames, which facilitate to improve the precision of the star sensor.

An equation correlating a star image frame sequence to the $1^{st}$ frame is given by the equation (17) which may be solved using the least square method to obtain the optimal attitude matrix $\tilde{C}_{ss}^{ini}(1)$ of the $1^{st}$ frame of the star sensor. The optimal attitude matrix $\tilde{C}_{ss}^{ini}(1)$ of the $1^{st}$ frame is multiplied by the angular correlation matrix of the corresponding frame $l_0 \in [2,k]$ to obtain the optimal attitude matrix $\tilde{C}_{ss}^{ini}(l_0)=\tilde{C}_{ss}^{ini}(1)C_{l_0}^1$ of each frame ($l_0$=2,3, ..., k), wherein $C_{l_0}^1$ is the angular correlation matrix from the $l_0^{th}$ frame to the $1^{st}$ frame. The attitude angles $\phi_x$, $\phi_y$, and $\phi_z$ of the $l_{0A}^{th}$ frame of the star sensor are calculated using the optimal attitude matrix $\tilde{C}_{ss}^{ini}(l_{0A})$ of the $l_{0A}^{th}$ frame of the star sensor according to the equation (8) ($l_{0A} \in [1,k]$):

$$\begin{cases} \phi_x = \arcsin[\tilde{C}_{ss}^{ini}(3,2)] \\ \phi_y = -\arcsin[\tilde{C}_{ss}^{ini}(3,1)/\tilde{C}_{ss}^{ini}(3,3)] \\ \phi_z = -\arcsin[\tilde{C}_{ss}^{ini}(1,2)/\tilde{C}_{ss}^{ini}(2,2)] \end{cases} \qquad (21)$$

wherein, $\tilde{C}_{ss}^{ini}(3,2)$, $\tilde{C}_{ss}^{ini}(3,1)$, $\tilde{C}_{ss}^{ini}(3,3)$, $\tilde{C}_{ss}^{ini}(1,2)$, and $\tilde{C}_{ss}^{ini}(2,2)$ are elements of the optimal attitude matrix $\tilde{C}_{ss}^{ini}(l_{0A})$ of the $l_{0A}^{th}$ frame of the star sensor. For example, $\tilde{C}_{ss}^{ini}(3,2)$ corresponds to the element at the $3^{rd}$ row and $2^{nd}$ column of $\tilde{C}_{ss}^{ini}(l_{0A})$.

In the ACF-based star map frame sequence correlation method, either the $1^{st}$ frame or other frame may be correlated for moving processing. Without loss of generality, for a star image frame sequence $1^{st}, \ldots, (j-1)^{th}, j^{th}, (j+1)^{th}, \ldots, (j+k)^{th}$, the $(j+1)^{th}$ frame, ..., and the $(j+k)^{th}$ frame may be correlated to the $j^{th}$ frame forwards through an angular correlation matrix measured by the gyro, to obtain a forward correlation equation:

$$\begin{cases} [P_j, P_{j+1}, \ldots, P_{j+k}] = C_{ss}^{ini}(j)[(S_j + E_j), \\ (S_{j+1}^j + E_{j+1}^j), \ldots, (S_{j+k}^j + E_{j+k}^j)] \\ S_{j+l}^j = \left(\prod_{r=1}^{r=l} C_{j+r}^{j+r-1}\right)S_{j+l} = C_{j+l}^j S_{j+l} \\ E_{j+l}^j = \left(\prod_{r=1}^{r=l} C_{j+r}^{j+r-1}\right)E_{j+l} = C_{j+l}^j E_{j+l}, l \in [1,k] \end{cases} \qquad (22)$$

The frames from the $j^{th}$ frame to the $(j+k-1)^{th}$ frame may be also correlated to the current $(j+k)^{th}$ frame backwards through the angular correlation matrix measured by the gyro to obtain a backward correlation equation:

$$\begin{cases} [P_{j+k}, P_{j+k-1}, \ldots, P_j] = C_{ss}^{ini}(j+k)[(S_{j+k} + E_{j+k}), \\ (S_{j+k-1}^{j+k} + E_{j+k-1}^{j+k}), \ldots, (S_j^{j+k} + E_j^{j+k})] \\ S_j^{j+l} = \left(\prod_{r=l}^{r=1} C_{j+r-1}^{j+r}\right)S_j = C_j^{j+l} S_j \\ E_j^{j+l} = \left(\prod_{r=l}^{r=1} C_{j+r-1}^{j+r}\right)E_j = C_j^{j+l} E_j, l \in [1,k] \end{cases} \qquad (23)$$

wherein, $(P_j, S_j), \ldots,$ and $(P_{j+k}, S_{j+k})$ are direction vector matrixes of the star points in a star image frame obtained through the search-matching of each of the $j^{th}$ frame, ..., the $(j+k)^{th}$ frame of the star image measured by the star sensor, relative to the inertial coordinate system and the star sensor coordinate system, $E_j, \ldots,$ and $E_{j+k}$ are error vector matrixes of the star points in each of the $j^{th}$ frame, ..., and the $(j+k)^{th}$ frame of the star image measured by the star sensor, $C_{ss}^{ini}(j)$ is a transform matrix from a coordinate system of the star sensor for the $j^{th}$ frame to the inertial coordinate system, $C_{ss}^{ini}(j+k)$ is a transform matrix from a coordinate system of the star sensor for the current $(j+k)^{th}$ frame to the inertial coordinate system, $C_{j+r}^{j+r-1}$ is an angular correlation matrix measured by the gyro unit from the $(j+r)^{th}$ frame of the star sensor to the $(j+r-1)^{th}$ frame of the star sensor, $C_{j+r-1}^{j+r}$ is an angular correlation matrix from the $(j+r-1)^{th}$ frame of the star sensor to the $(j+r)^{th}$ frame of the star sensor ($[C_{j+r}^{j+r-1}]=[C_{j+r-1}^{j+r}]^T$), $C_{j+l}^j$ is an angular correlation matrix that directly correlates the $(j+l)^{th}$ frame of the star sensor to the $j^{th}$ frame of the star sensor, and $C_j^{j+l}$ is an angular correlation matrix that directly correlates the $j^{th}$ frame to the $(j+l)^{th}$ frame ($[C_{j+l}^j]=[C_j^{j+l}]^T$).

According to the forward correlation equation described by the equation (22), an optimal attitude matrix $\tilde{C}_{ss}^{ini}(j)$ of the $j^{th}$ frame of the star sensor is solved by using the least square method, the optimal attitude matrix $\tilde{C}_{ss}^{ini}(j)$ of the $j^{th}$ frame is multiplied by the angular correlation matrix $C_{j-l}^j$ from the $(j+l)^{th}$ frame to the $j^{th}$ frame to obtain an optimal attitude matrix of the $(j+l)^{th}$ frame, i.e., $\tilde{C}_{ss}^{ini}(j+l)=\tilde{C}_{ss}^{ini}(j)C_{j+l}^j$, $l \in [1,k]$; or, according to the backward correlation equation described by the equation (23), an optimal attitude matrix $\tilde{C}_{ss}^{ini}(j+k)$ of the current $(j+k)^{th}$ frame of the star sensor may be also solved by using the least square method directly. The optimal attitude matrix $\tilde{C}_{ss}^{ini}(j+k)$ of the current $(j+k)^{th}$ frame is multiplied by the angular correlation matrix $C_{j+l-1}^{j+k}$ from the $(j+l-1)^{th}$ frame to the $(j+k)^{th}$ frame to obtain an optimal attitude matrix of the $(j+1-1)^{th}$ frame, $\tilde{\bar{C}}_{ss}^{ini}(j+1-1)=\tilde{\bar{C}}_{ss}^{ini}(j+k)C_{j+l-1}^{j+k}$, $l\in[1,k]$. The attitude angles $\phi_x$, $\phi_y$, and $\phi_z$ of the $(j+l_A)^{th}$ frame of the star sensor may be calculated according to equation (21) using the optimal attitude matrix $\tilde{\bar{C}}_{ss}^{ini}(j+l_A)$, ($l_A \in [0,k]$).

In the above frame correlation algorithm, the number of the fixed star vectors is increased substantially. Thus, the noise suppression ability is strengthened. Accordingly, the amount of calculation increases exponentially. To this end, the present disclosure further proposes a simplified solution algorithm based on the optimal attitude matrix of a single frame which is called the average optimal solution. According to the optimal attitude matrix solution $\tilde{C}_{ss}^{ini}$ of a single frame described by the equation (7), the independent optimal solution sequence $\tilde{C}_{ss}^{ini}(j)$, $\tilde{C}_{ss}^{ini}(j+1)$, ..., $\tilde{C}_{ss}^{ini}(j+k-1)$, $\tilde{C}_{ss}^{ini}(j+k)$ for each frame may be obtained. According to the forward correlation equation described by the equation (22), an average optimal attitude matrix $\bar{C}_{ss}^{ini}(j)$ of the $j^{th}$ frame may be obtained:

$$\bar{C}_{ss}^{ini}(j) = \frac{1}{k+1} \{\tilde{C}_{ss}^{ini}(j) + \tilde{C}_{ss}^{ini}(j+1)C_j^{j+1} + \ldots + [\tilde{C}_{ss}^{ini}(j+k)C_{j+k-1}^{j+k}C_{j+k-2}^{j+k-1}\ldots C_j^{j+1}]\} \quad (24)$$

According to the backward correlation equation described by the equation (23), an average optimal attitude matrix $\bar{C}_{ss}^{ini}(j+k)$ of the current $(j+k)^{th}$ frame may be obtained:

$$\bar{C}_{ss}^{ini}(j+k) = \frac{1}{k+1} \{\tilde{C}_{ss}^{ini}(j+k) + \tilde{C}_{ss}^{ini}(j+k-1)C_{j+k}^{j+k-1} + \ldots + [\tilde{C}_{ss}^{ini}(j)C_{j+1}^{j}C_{j+2}^{j+1}\ldots C_{j+k}^{j+k-1}]\} \quad (25)$$

The precision and the noise suppression ability obtained by the solving method of the average optimal attitude matrix is equivalent to that obtained by using the equations (22) and (23), however, the amount of calculation is reduced hugely.

In addition, according to the equation (24), the average equation of forward correlation may be further simplified as a recursion formula:

$$\bar{C}_{ss}^{ini}(j) = \frac{1}{k+1}\tilde{C}_{ss}^{ini}(j) + \frac{1}{k+1}\{\tilde{C}_{ss}^{ini}(j+1) + \tilde{C}_{ss}^{ini}(j+2)C_{j+1}^{j+2} + \quad (26)$$
$$\ldots + [\tilde{C}_{ss}^{ini}(j+k+1)C_{j+k}^{j+k+1}\ldots C_{j+1}^{j+2}]\}C_j^{j+1} -$$
$$\frac{1}{k+1}[\tilde{C}_{ss}^{ini}(j+k+1)C_{j+k}^{j+k+1}\ldots C_j^{j+1}] = \frac{1}{k+1}\tilde{C}_{ss}^{ini}(j) +$$
$$\bar{C}_{ss}^{ini}(j+1)C_j^{j+1} - \frac{1}{k+1}[\tilde{C}_{ss}^{ini}(j+k+1)C_{j+k}^{j+k+1}\ldots C_j^{j+1}]$$

wherein, $\bar{C}_{ss}^{ini}(j+1)$ is the average optimal attitude matrix of the $(j+1)^{th}$ frame of the star sensor, $\tilde{C}_{ss}^{ini}(j)$ is the single-frame optimal attitude matrix of the $j^{th}$ frame, and $\tilde{C}_{ss}^{ini}(j+k+1)$ is the single-frame optimal attitude matrix of the $(j+k+1)^{th}$ frame next to the current $(j+k)^{th}$ frame.

Similarly, according to the equation (25), the average equation of the backward correlation may be also further simplified as a recursion formula:

$$\bar{C}_{ss}^{ini}(j+k) = \quad (27)$$
$$\frac{1}{k+1}\tilde{C}_{ss}^{ini}(j+k) + \frac{1}{k+1}\{\tilde{C}_{ss}^{ini}(j+k-1) + \tilde{C}_{ss}^{ini}(j+k-2)C_{j+k-1}^{j+k-2} +$$
$$\ldots + [\tilde{C}_{ss}^{ini}(j-1)C_j^{j-1}\ldots C_{j+k-1}^{j+k-2}]\}C_{j+k}^{j+k-1} -$$
$$\frac{1}{k+1}[\tilde{C}_{ss}^{ini}(j-1)C_j^{j-1}\ldots C_{j+k}^{j+k-1}] = \frac{1}{k+1}\tilde{C}_{ss}^{ini}(j+k) +$$
$$\bar{C}_{ss}^{ini}(j+k-1)C_{j-k}^{j+k-1} - \frac{1}{k+1}[\tilde{C}_{ss}^{ini}(j-1)C_j^{j-1}\ldots C_{j+k}^{j+k-1}]$$

wherein, $\bar{C}_{ss}^{ini}(j+k-1)$ is the average optimal attitude matrix of the $(j+k-1)^{th}$ frame of the star sensor, $\tilde{C}_{ss}^{ini}(j+k)$ is the single-frame optimal attitude matrix of the $(j+k)^{th}$ frame, and $\tilde{C}_{ss}^{ini}(j-1)$ is the single-frame optimal attitude matrix of the $(j-1)^{th}$ frame.

Compared to the prior art, the present disclosure has the following advantages: some embodiments of the present invention may effectively suppress the dynamic error and noise influences, and thus the high-precision dynamic attitude of the motion carrier and its change information may be obtained. Also, it may meet the requirement of high-precision measurement under dynamic conditions.

Embodiments of the present disclosure are described as follows.

Step 1: establishing a synchronous sampling time sequence.

In order to ensure the precisions of the angular velocity measured by the gyro unit and angle calculation, the sampling frequency $f_{gu}$ of the GU is much higher than the exposure frequency $f_{ss}$ of the SS. The sampling frequency $f_{gu}$ is generally in the order of kilohertz, while the exposure frequency $f_{ss}$ is in the order of 10 Hz. Meanwhile, in order to ensure precise angle correlation, the sampling frequency of the GU shall be strictly synchronous with the exposure frequency of the SS, and also they shall have a strict integral relationship m, i.e., $f_{gu}=mf_{ss}$, then $\tau=m\delta\tau$, as illustrated in FIG. 4.

Figure 4B:
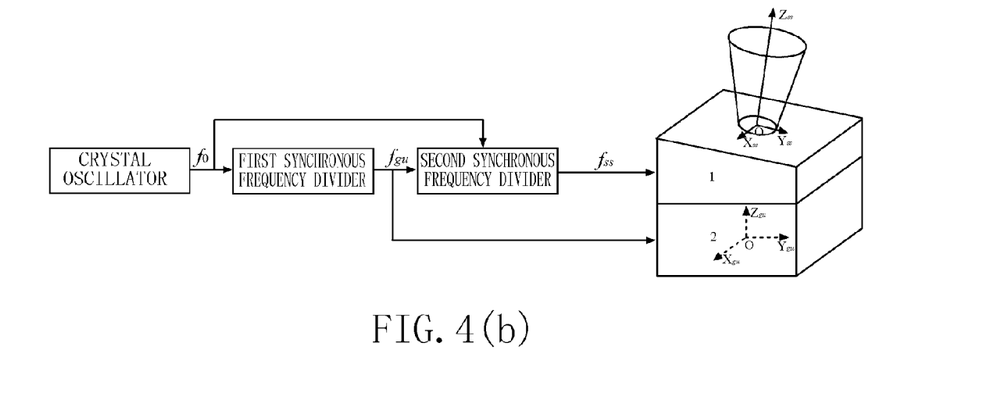
FIG. 4(b) is a circuit structure diagram showing synchronous sampling time sequences of the gyro unit and the star sensor.

FIG. 4(a) is a schematic diagram of synchronous time sequence relationship between the sampling frequency $f_{gu}$ and the exposure frequency $f_{ss}$, and FIG. 4(b) is a synchronous circuit diagram. The crystal oscillator generates a standard time frequency $f_0$, and the frequency division coefficients of a first synchronous frequency divider is denoted by M, and the frequency division coefficient of a second synchronous frequency divider is denoted by m, then:

$$f_{gu} = \frac{f_0}{M}, f_{ss} = \frac{f_{gu}}{m} = \frac{f_0}{Mm} \quad (28)$$

The synchronous relationship between the SS and the GU is ensured by the equation (28).

Step 2: measuring, by the GU, an angular correlation matrix and an angular relationship of adjacent frames.

Figure 5:
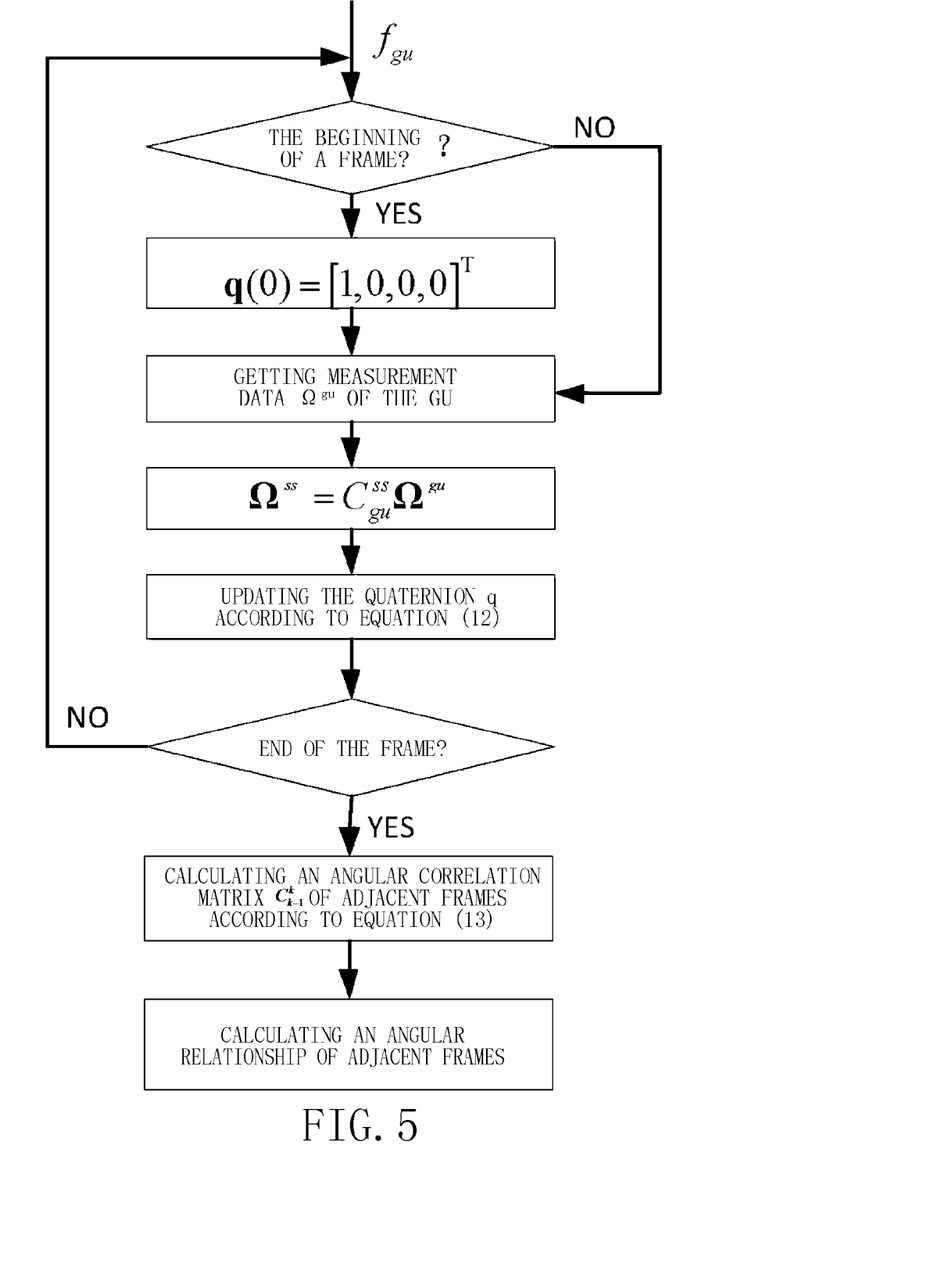
FIG. 5 is a flowchart for the transform matrixes of adjacent frames from a gyro's measurement.

Firstly, the angular velocity vector of the GU denoted by $\Omega^{gu}=[\Omega_x, \Omega_y, \Omega_z]^T$ is obtained by sampling three angular velocity components $\Omega_x$, $\Omega_y$ and $\Omega_z$ of the GU synchronously at the frequency $f_{gu}$. Then, the angular velocity of the SS is calculated according to the equation (10), i.e. $\Omega^{ss}=C_{gu}^{ss}\Omega^{gu}$, and the attitude quaternion q is updated according to the equation (12). The three angular velocity components of the GU are repetitively sampled at the sampling frequency $f_{gu}$ and the quaternion q is updated continuously until one measurement frame is completed. Finally, the angular correlation matrix of adjacent frames is calculated according to the equation (13), i.e., $C_{k-1}{}^k=[C_k{}^{k-1}]^T$, and the angular relationship of adjacent frames is calculated according to the equation (14). Corresponding flowchart is illustrated in FIG. 5.

Step 3: sampling a star image frame of the SS synchronously at the frequency $f_{ss}$.

Figure 6:
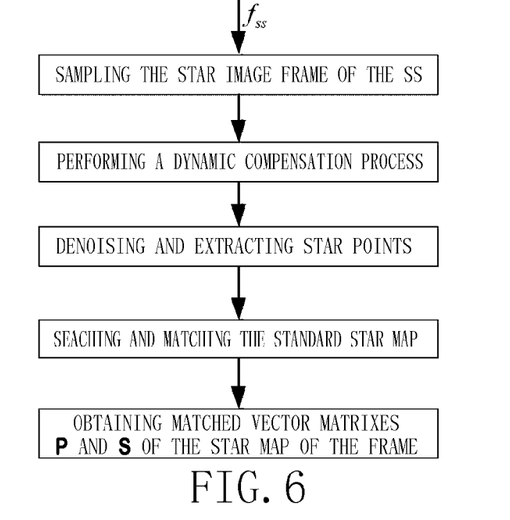
FIG. 6 is a flowchart for obtaining matched vector sequences of fixed stars by a star sensor.

The star image frame of the SS is synchronously sampled at the frequency $f_{ss}$, and processed with dynamic motion compensation based on the existing method (see "*Principle and System Application of Missile Borne Star Sensor*", published by National Defense Industry Press in 2010, Liu Chaoshan, etc.). Then, a denoising processing is implemented and the coordinates of star points are extracted. After that, a search-matching triangle sequence is constructed and searched to match the standard star image. Finally, the fixed star vector matrix P in the inertial coordinate system and a direction vector matrix S in the star sensor coordinate system are obtained, which matches the star image of the present frame. Corresponding flowchart is illustrated in FIG. 6.

Step 4: determining the attitudes using correlated frame sequences.

Figure 7:
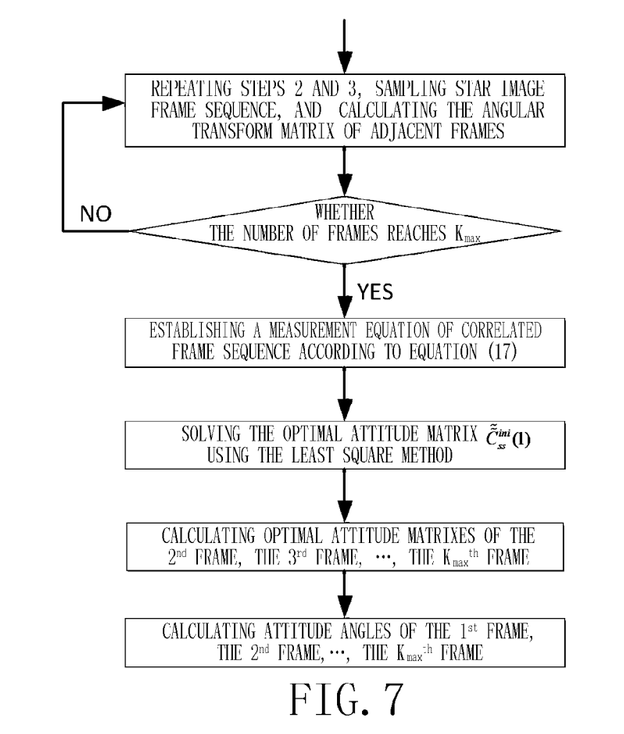
FIG. 7 is a flowchart for attitude determination using correlated frame sequences.

Repeating steps 2 and 3, the star image frame sequence of the SS is synchronously and continuously sampled at the frequency $f_{ss}$ and the angular transform matrix of adjacent frames is calculated, until the number of correlated frames is equal to $K_{max}$. The measurement equation of correlated frame sequence is established according to the equation (17), and the optimal attitude matrix $\widetilde{\overline{C}}_{ss}{}^{ini}(1)$ is solved by using the least square method. The optimal attitude matrix of each frame from the $2^{nd}$ frame, . . . , to the $K_{max}{}^{th}$ frame may be obtained by multiplying the optional attitude matrix $\widetilde{\overline{C}}_{ss}{}^{ini}(1)$ by the transform matrix of the corresponding frame is $\widetilde{\overline{C}}_{ss}{}^{ini}(l)=\widetilde{\overline{C}}_{ss}{}^{ini}(1)C_l^1$ ($C_l^1$ is an angular correlation matrix from the $l^{th}$ frame of the star sensor to the $1^{st}$ frame of the star sensor, $C_l^1=C_2^1C_3^2\ldots C_l^{l-1}$). The attitude angles $\phi_x$, $\phi_y$ and $\phi_z$ of each of the $1^{st}$ frame, . . . , and the $K_{max}{}^{th}$ frame of the star sensor relative to the inertial coordinate system are calculated according to the equation (21). Corresponding flowchart is illustrated in FIG. 7.

Step 5: updating the star image frame of the SS and the transform matrix of the GU.

Figure 8:
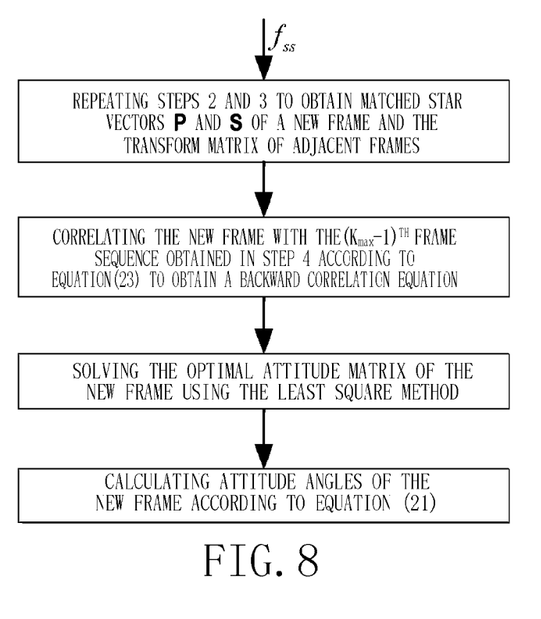
FIG. 8 is a flowchart for updating the attitude.

Repeating steps 2 and 3 to obtain matched star vectors P and S of a new frame and the transform matrix of adjacent frames. According to the equation (23), the new frame is correlated with the previous ($K_{max}-1$) frame sequence to obtain the backward correlation equation. Then, the optimal attitude matrix of the new frame is obtained by solving the attitude matrix with the least square method. Finally, the attitude angles $\phi_x$, $\phi_y$ and $\phi_z$ is calculated according to the equation (21) to output the attitude in real time. Corresponding flowchart is illustrated in FIG. 8.

Step 6: repeating step 5 to update the measurement frame continuously and output the attitude in real time.

What is claimed is:

1. A dynamic attitude measurement method of a star sensor based on gyro's precise angular correlation utilizing an attitude measurement device comprising a gyro unit comprising three single-axis gyros mounted orthogonally to each other and a star sensor rigidly and fixedly coupled with the gyro unit, wherein said method comprising:
   1) establishing a synchronous sampling time sequence of the gyro unit and the star sensor so as to configure sampling frequency of the gyro unit to be integral multiple of exposure frequency of the sensor star;
   2) sampling by the sensor star with the exposure frequency so as to measure a sequence of frames of star image comprising a $1^{st}$ frame, . . . , a $(i-1)^{th}$ frame, and a $i^{th}$ frame, and performing dynamic motion compensation and denoising processing on each frame of the sequence of frames of star image so as to extract n effective star points from each frame of the sequence of frames of star image;
   3) searching and matching the n effective star points extracted from each frame of the sequence of frames of star image with a standard star image, obtaining direction vectors $p_1, p_2, \ldots$, and $p_n$ of the n effective star points from each frame of the sequence of frames of star image in an inertial coordinate system wherein the direction vectors $p_1, p_2$, and $p_n$ form a direction vector matrix P of the n effective star points from each frame in the inertial coordinate system, and obtaining direction vector $s_1, s_2, \ldots$, and $s_n$ of the n effective star points from each frame of the sequence of frames of star image in a star sensor coordinate system, wherein the direction vector $s_1, s_2, \ldots$, and $s_n$ form a direction vector matrix S of the n effective star points from each frame in the star sensor coordinate system;
   4) during each period from a start point of sampling a current star image frame by the star sensor to a start point of sampling a star image frame immediately next to the current star image by the star sensor, simultaneously sampling angular velocity of the gyro unit by the gyro unit with the sampling frequency, and calculating an angular correlation matrix from the current star image frame to the next star image frame:
      a) measuring three angular velocity components $\Omega_x, \Omega_y$, and $\Omega_z$ along X-axis, Y-axis and Z-axis in a gyro unit coordinate system of the gyro unit by sampling the angular velocity of the gyro unit by the gyro unit with the sampling frequency, and calculating angular velocity $\Omega^{ss}$ of the star sensor with following equation:

$$\Omega^{ss}=C_{gu}{}^{ss}\Omega^{gu}$$

wherein $\Omega^{gu}=[\Omega_x,\Omega_y,\Omega_z]^T$, symbol $[\cdot]^T$ denotes a transposed matrix of $\cdot$, and the $C_{gu}{}^{ss}$ denotes transform matrix from the gyro unit coordinate system to the star sensor coordinate system;
      b) setting an initial value $q(0)$ of an attitude quaternion q as $[1,0,0,0]^T$, and updating the attitude quaternion q with following equation:

$$q(\lambda) = \begin{bmatrix} q_0(\lambda-1), -q_1(\lambda-1), -q_2(\lambda-1), -q_3(\lambda-1) \\ q_1(\lambda-1), q_0(\lambda-1), -q_3(\lambda-1), q_2(\lambda-1) \\ q_2(\lambda-1), q_3(\lambda-1), q_0(\lambda-1), -q_1(\lambda-1) \\ q_3(\lambda-1), -q_2(\lambda-1), q_1(\lambda-1), q_0(\lambda-1) \end{bmatrix}$$

$$\begin{bmatrix} \cos(|\delta\Phi|/2) \\ (\delta\Phi_x/|\delta\Phi|)\sin(|\delta\Phi|/2) \\ (\delta\Phi_y/|\delta\Phi|)\sin(|\delta\Phi|/2) \\ (\delta\Phi_z/|\delta\Phi|)\sin(|\delta\Phi|/2) \end{bmatrix}$$

wherein $q(\lambda-1)$ denotes the attitude quaternion before the $\lambda^{th}$ sampling by the gyro unit, $q(\lambda)$ denotes the attitude quaternion after the $\lambda^{th}$ sampling by the gyro unit, $\delta\phi$ denotes an angular increment of the gyro unit in the star sensor coordinate system during a time interval $\delta\tau$, wherein the time interval $\delta\tau$ is a time interval of the $\lambda^{th}$ sampling by the gyro unit, and $\delta\phi=[\delta\phi_x,\delta\phi_y,\delta\phi_z]^T=\Omega^{ss}(\lambda)\delta\tau$, $\delta\phi_x$, $\delta\phi_z$ denotes components of $\delta\phi$ along X-axis, Y-axis, and Z-axis in the star sensor coordinate system, $\Omega^{ss}(\lambda)$ denotes the angular velocity of the star sensor at the $\lambda^{th}$ sampling in the star sensor coordinate system, $|\delta\phi|$ denotes module of $\delta\phi$, and sin( )denotes sine function;
- c) repeating the measuring three angular velocity components $\Omega_x$, $\Omega_y$, and $\Omega_z$ along X axis, Y-axis and Z-axis in the gyro unit coordinate system of the gyro unit, the calculating angular velocity $\Omega^{ss}$ of the star sensor and the updating the attitude quaternion q based on the calculated angular velocity $\Omega^{ss}$ of the star sensor, until start point of sampling the next star image frame by the star sensor;
- d) calculating, based on the updated attitude quaternion q at the start point of the sampling the next star image frame by the star sensor, the angular correlation matrix from the current star image frame to the next star image frame with following equation:

$$C_m^{m-1} = \begin{pmatrix} q_0^2 + q_1^2 - q_2^2 - q_3^2 & 2(q_1q_2 - q_0q_3) & 2(q_1q_3 + q_0q_2) \\ 2(q_1q_2 + q_0q_3) & q_0^2 - q_1^2 + q_2^2 - q_3^2 & 2(q_2q_3 - q_0q_1) \\ 2(q_1q_3 - q_0q_2) & 2(q_2q_3 + q_0q_1) & q_0^2 - q_1^2 - q_2^2 + q_3^2 \end{pmatrix}$$

wherein m denotes the number of the next star image frame in the sequence of frames of star image, m−1 denotes the number of the current star image frame in the sequence of frames of star image, $C_m^{m-1}$ denotes the angular correlation matrix from the current star image frame to the next star image frame, and $q_0$, $q_1$, $q_2$, $q_3$ denotes four elements of said updated attitude quaternion;

5) based on the sequence of frames of star image comprising the $1^{st}$ frame, ..., the $(i-1)^{th}$ frame, and the $i^{th}$ frame measured by the star sensor and the calculated angular correlation matrixes of each pair of star image frames comprising two adjacent star image frames, according to following correlation equation, calculating an optimal attitude matrix $\tilde{\tilde{C}}_{ss}^{ini}(1)$ of the $1^{th}$ frame relative to the inertial coordinate system by using a least square method; and obtaining an optimal attitude matrix $\tilde{\tilde{C}}_{ss}^{ini}(l_0)$ of the $l_0^{th}$ frame relative to the inertial coordinate system by multiplying the optimal attitude matrix $\tilde{\tilde{C}}_{ss}^{ini}(1)$ of the $1^{th}$ frame by the angular correlation matrix $C_{l_0}^{1}$ from the $l_0^{th}$ frame directly to the $1^{th}$ frame, i.e., $\tilde{\tilde{C}}_{ss}^{ini}(l_0) = \tilde{\tilde{C}}_{ss}^{ini}(1)C_{l_0}^{1}$, wherein $l_0 \in [2,i]$, and $C_{l_0}^{1} = C_2^{1} C_3^{2} \ldots C_{l_0}^{l_0-1}$, wherein the correlation equation is:

$$\begin{cases} [P_1, P_2, \ldots, P_i] = C_{ss}^{ini}(1)[(S_1 + E_1), (S_2^1 + E_2^1), \ldots, (S_i^1 + E_i^1)] \\ S_{l_0}^1 = \left(\prod_{r=2}^{r=l_0} C_r^{r-1}\right) S_{l_0} = C_{l_0}^1 S_{l_0} \\ E_{l_0}^1 = \left(\prod_{r=2}^{r=l_0} C_r^{r-1}\right) E_{l_0} = C_{l_0}^1 E_{l_0}, \quad l_0 \in [2, i] \end{cases}$$

wherein $P_1$, $P_2$, ... $P_i$ are direction vector matrixes of the effective star points, which are obtained by search-matching for each of the $1^{th}$ frame, the $2^{nd}$ frame, ..., the $i^{th}$ frame of the sequence of frames of star image measured by the star sensor, in the inertial coordinate system and $S_1$, $S_2$, ..., $S_i$ are direction vector matrixes of the effective star points, which are obtained by search-matching for each of the $1^{th}$ frame, the $2^{nd}$ frame, ..., the $i^{th}$ frame of the sequence of frames of star image measured by the star sensor, in the star sensor coordinate system;

$E_1$, $E_2$, ..., $E_i$ are error vector matrixes of the effective star points for each of the $1^{th}$ frame, the $2^{nd}$ frame, ..., the $i^{th}$ frame of the sequence of frames of star image, which are caused by extraction error of star points; $C_{ss}^{ini}(1)$ is a transform matrix from a coordinate system of the star sensor for the $1^{th}$ frame to the inertial coordinate system and $C_r^{r-1}$, is the angular correlation matrix from the $r^{th}$ frame of the sequence of frames of star image to the $(r-1)^{th}$ frame of the sequence of frames of star image;

6) calculating attitude angles $\phi_x$, $\phi_y$, and $\phi_z$ of the $0_A^{th}$ frame of the sequence of frames of star image by using the optimal attitude matrix $\tilde{\tilde{C}}_{ss}^{ini}(l_{0A})$ of the $l_{0A}^{th}$ frame of the sequence of frames of star image obtained in step 5) with following equation and outputting the calculated sequence of frames of star image as dynamic attitude of the star sensor, wherein $l_{0A} \in [1,i]$:

$$\begin{cases} \phi_x = \arcsin\left[\tilde{\tilde{C}}_{ss}^{ini}(3, 2)\right] \\ \phi_y = -\arctan\left[\tilde{\tilde{C}}_{ss}^{ini}(3, 1)/\tilde{\tilde{C}}_{ss}^{ini}(3, 3)\right] \\ \phi_z = -\arctan\left[\tilde{\tilde{C}}_{ss}^{ini}(1, 2)/\tilde{\tilde{C}}_{ss}^{ini}(2, 2)\right] \end{cases}$$

wherein, $\tilde{\tilde{C}}_{ss}^{ini}(3,2)$, $\tilde{\tilde{C}}_{ss}^{ini}(3,1)$, $\tilde{\tilde{C}}_{ss}^{ini}(3,3)$, $\tilde{\tilde{C}}_{ss}^{ini}(1,2)$ and $\tilde{\tilde{C}}_{ss}^{ini}(2,2)$ are matrix elements in the optimal attitude matrix $\tilde{\tilde{C}}_{ss}^{ini}(l_{0A})$ of the $l_{0A}^{th}$ frame of the sequence of frames of star image, and a first digit in parentheses denotes row number in the optimal attitude matrix $\tilde{\tilde{C}}_{ss}^{ini}(l_{0A})$ and a second digit in parentheses denotes column number in the optimal attitude matrix $\tilde{\tilde{C}}_{ss}^{ini}(l_{0A})$, arcsin denotes anti-sine function and arctan denotes anti-tangent function, wherein the dynamic attitude of the star sensor reflects the dynamic attitude of a motion carrier, on which the star sensor is fixed, and wherein the dynamic attitude of the motion carrier is used for the navigation-positioning of the motion carrier.

2. The dynamic attitude measurement method of a star sensor based on gyro's precise angle correlation according to claim 1, further comprising:

based on a sequence of frames of star image comprising a $1^{st}$ frame, ..., a $(j-1)^{th}$ frame, a $j^{th}$ frame, a $(j+1)^{th}$ frame, ..., a $(j+k)^{th}$ frame measured by the star sensor and the calculated angular correlation matrixes of each pair of star image frames comprising two adjacent star image frames, calculating, according to a forward correlation equation, an optimal attitude matrix $\tilde{\tilde{C}}_{ss}^{ini}(j)$ of the $j^{th}$ frame relative to the inertial coordinate system by using the least square method; and obtaining an optimal attitude matrix of the $(j+1)^{th}$ frame relative to the inertial coordinate system by multiplying the optimal attitude matrix $\tilde{\tilde{C}}_{ss}^{ini}(j)$ of the $j^{th}$ frame by the angular correlation matrix $C_{j+l}^{j}$ from the $(j+l)^{th}$ frame to the $j^{th}$ frame, wherein $\tilde{\tilde{C}}_{ss}^{ini}(j+l) = \tilde{\tilde{C}}_{ss}^{ini}(j)C_{j+l}^{j}$, $l \in [1,k]$, so as to obtain an optimal attitude matrix $\tilde{\tilde{C}}_{ss}^{ini}(j+l_A)$ of a $(j+l_A)^{th}$ frame, wherein $l_A \in [0,k]$; or based on a sequence of frames of star image comprising a 1st frame, . . . , a $(j-1)^{th}$ frame, a $j^{th}$ frame, a $(j+1)^{th}$ frame, . . . , a $(j+k)^{th}$ frame measured by the star sensor and the calculated angular correlation matrixes of each pair of star image frames comprising two adjacent star image frames, directly calculating, according to a backward correlation equation, an optimal attitude matrix $\widetilde{\widetilde{C}}_{ss}^{ini}(j+k)$ of the $(j+k)^{th}$ frame relative to the inertial coordinate system by using the least square method; and obtaining an optimal attitude matrix $\widetilde{\widetilde{C}}_{ss}^{ini}(j+l-1)$ of the $(j+l-1)^{th}$ frame relative to the inertial coordinate system by multiplying the optimal attitude matrix $\widetilde{\widetilde{C}}_{ss}^{ini}(j+k)$ of the $(j+k)^{th}$ frame by an angular correlation matrix $C_{j+l-1}^{j+k}$ from the $(j+l-1)^{th}$ frame to the $(j+k)^{th}$ frame, wherein $\widetilde{\widetilde{C}}_{ss}^{ini}(j+l-1) = \widetilde{\widetilde{C}}_{ss}^{ini}(j+k)C_{j+l-1}^{j+k}, l \in [1k]$, so as to obtain an optimal attitude matrix $\widetilde{\widetilde{C}}_{ss}^{ini}(j+l_A)$ of a $(j+l_A)^{th}$ frame, wherein $l_A \in [0,k]$;

wherein the forward correlation equation is:

$$\begin{cases} [P_j, P_{j+1}, \ldots, P_{j+k}]C_{ss}^{ini}(j)[(S_j+E_j), (S_{j+1}^j+E_{j+1}^j), \ldots, (S_{j+k}^j+E_{j+k}^j)] \\ S_{j+1}^j = \left(\prod_{r=1}^{r=l} C_{j+r}^{j+r-1}\right)S_{j+1} = C_{j+l}^j S_{j+l} \\ E_{j+1}^j = \left(\prod_{r=1}^{r=l} C_{j+r}^{j+r-1}\right)E_{j+l} = C_{j+l}^j E_{j+l}, l \in [1,k] \end{cases}$$

the backward correlation equation is:

$$\begin{cases} [P_{j+k}, P_{j+k-1}, \ldots, P_j]C_{ss}^{ini}(j+k)[(S_{j+k}+E_{j+k}), \\ (S_{j+k-1}^{j+k}+E_{j+k-1}^{j+k}), \ldots, (S_j^{j+k}+E_j^{j+k})] \\ S_j^{j+l} = \left(\prod_{r=1}^{r=l} C_{j+r-1}^{j+r}\right)S_j = C_j^{j+l} S_j \\ E_j^{j+l} = \left(\prod_{r=1}^{r=l} C_{j+r-1}^{j+r}\right)E_j = C_j^{j+l} E_j, l \in [1,k] \end{cases}$$

wherein, $(P_j, S_j)$, . . . ,$(P_{j+k}, S_{j+k})$ are direction vector matrixes of the effective star points, which are obtained by search-matching for each of the $j^{th}$ frame, . . . , and the $(j+k)^{th}$ frame of the sequence of frames of star image measured by the star sensor, in the inertial coordinate system and the star sensor coordinate system respectively; $E_j$, . . . , and, $E_{j+k}$ are error vector matrixes of the effective star points for each of the $j^{th}$ frame, . . . , and the $(j+k)^{th}$ frame measured by the star sensor, which are caused by extraction error of star points; $\widetilde{C}_{ss}^{ini}(j)$ is a transform matrix from a coordinate system of the star sensor for the $j^{th}$ frame to the inertial coordinate system; $C_{ss}^{ini}(j+k)$ is a transform matrix from a coordinate system of the star sensor for the $(j+k)^{th}$ frame to the inertial coordinate system; $C_{j+r}^{j+r-1}$ is an angular correlation matrix from a $(j+r)^{th}$ frame to a $(j+r-1)^{th}$ frame, $C_{j+r-1}^{j+r}$ is an angular correlation matrix from the $(j+r-1)^{th}$ frame to a $(j+r)^{th}$ frame, and $[C_{j+r}^{j+r-1}]=[C_{j+r-1}^{j+r}]^T$; $C_j^{j+l}$ is an angular correlation matrix that directly correlates the $(j+l)^{th}$ frame to the $j^{th}$ frame, $C_j^{j+l}$ is an angular correlation matrix that directly correlates the $j^{th}$ frame to the $(j+l)^{th}$ frame, and $[C_{j+l}^j]=[C_j^{j+l}]^T$.

3. The dynamic attitude measurement method of a star sensor based on gyro's precise angle correlation according to claim 2, wherein a maximum value $K_{max}$ of the correlated frame number $(k+1)$ in the sequence of frames of the star images comprising the $j^{th}$ frame, the $(j+1)^{th}$ frame, . . . , and the $(j+k)^{th}$ frame is:

$$K_{max} = \frac{f_{ss}E_{exp}}{\omega};$$

wherein, $\omega$ is a measurement precision of the gyro unit, $f_{ss}$ is the exposure frequency of the star sensor, and $E_{exp}$ is an expected measurement precision of the star sensor.

4. The dynamic attitude measurement method of a star sensor based on gyro's precise angle correlation according to claim 2, wherein, an average optimal attitude matrix $\overline{\widetilde{C}}_{ss}^{ini}(j)$ of the $j^{th}$ frame is calculated as the optimal attitude matrix of the $j^{th}$ frame relative to the inertial coordinate system by using an average equation of forward correlation, in place of the calculating, according to the forward correlation equation, the optimal attitude matrix $\widetilde{\widetilde{C}}_{ss}^{ini}(j)$ of the $j^{th}$ frame relative to the inertial coordinate system by using the least square method; or an average optimal attitude matrix $\overline{\widetilde{C}}_{ss}^{ini}(j+k)$ of the $(j+k)^{th}$ frame is calculated as the optimal attitude matrix $\widetilde{\widetilde{C}}_{ss}^{ini}(j+k)$ of the $(j+k)^{th}$ frame relative to the inertial coordinate system by using an average equation of backward correlation, in place of the directly calculating, according to the backward correlation equation, the optimal attitude matrix $\widetilde{\widetilde{C}}_{ss}^{ini}(j+k)$ of the $(j+k)^{th}$ frame relative to the inertial coordinate system by using the least square method, wherein the average equation of forward correlation is:

$$\overline{\widetilde{C}}_{ss}^{ini}(j) = \frac{1}{k+1}\{\widetilde{C}_{ss}^{ini}(j) + \widetilde{C}_{ss}^{ini}(j+1)C_j^{j+1} + \ldots + [\widetilde{C}_{ss}^{ini}(j+k)C_{j+k-1}^{j+k}C_{j+k-2}^{j+k-1}\ldots C_j^{j+1}]\};$$

and
the average equation of backward correlation is:

$$\overline{\widetilde{C}}_{ss}^{ini}(j+k) = \frac{1}{k+1}\{\widetilde{C}_{ss}^{ini}(j+k) + \widetilde{C}_{ss}^{ini}(j+k-1)C_{j+k}^{j+k-1} + \ldots + [\widetilde{C}_{ss}^{ini}(j)C_{j+1}^j C_{j+2}^{j+1}\ldots C_{j+k}^{j+k-1}]\},$$

wherein $\widetilde{C}_{ss}^{ini}(j)$, . . . , $\widetilde{C}_{ss}^{ini}(j+k)$ are single frame optimal attitude matrixes of the $j^{th}$ frame, . . . , the $(j+k)^{th}$ frame relative to the inertial coordinate system, respectively.

5. The dynamic attitude measurement method of a star sensor based on gyro's precise angle correlation according to claim 4, wherein the average optimal attitude matrix $\overline{\widetilde{C}}_{ss}^{ini}(j)$ of the $j^{th}$ frame is calculated by using a recursion formula of forward correlation in place of the average equation of forward correlation, or the average optimal attitude matrix $\overline{\widetilde{C}}_{ss}^{ini}(j+k)$ of the $(j+k)^{th}$ frame is calculated by using a recursion formula of backward correlation in place of the average equation of backward correlation, wherein the recursion formula of the forward correlation is:

$$\overline{\tilde{C}}_{ss}^{ini}(j) = \frac{1}{k+1}\tilde{C}_{ss}^{ini}(j) + \overline{\tilde{C}}_{ss}^{ini}(j+1)C_j^{j+1} - \frac{1}{k+1}[\tilde{C}_{ss}^{ini}(j+k+1)C_{j+k}^{j+k-1}...C_j^{j+1}];$$

wherein, $\overline{\tilde{C}}_{ss}^{ini}(j+1)$ is the average optimal attitude matrix of the $(j+1)^{th}$ frame; $\tilde{C}_{ss}^{ini}(j)$ is the single frame optimal attitude matrix of the $j^{th}$ frame; $\tilde{C}_{ss}^{ini}(j+k+1)$ is the single frame optimal attitude matrix of the $(j+k+1)^{th}$ frame next to the $(j+k)^{th}$ frame; and wherein the recursion formula of backward correlation is:

$$\overline{\tilde{C}}_{ss}^{ini}(j+k) = \frac{1}{k+1}\tilde{C}_{ss}^{ini}(j+k) + \overline{\tilde{C}}_{ss}^{ini}(j+k-1)C_j^{j+k-1} - \frac{1}{k+1}[\tilde{C}_{ss}^{ini}(j-1)C_j^{j-1}...C_{j+k}^{j+k-1}];$$

wherein, $\overline{\tilde{C}}_{ss}^{ini}(j+k-1)$ is the average optimal attitude matrix of the $(j+k-1)^{th}$ frame; $\tilde{C}_{ss}^{ini}(j+k)$ is the single frame optimal attitude matrix of the $(j+k)^{th}$ frame; $\tilde{C}_{ss}^{ini}(j-1)$ is the single frame optimal attitude matrix of the $(j-1)^{th}$ frame.

\* \* \* \* \*